US012767019B2

United States Patent
(12) United States Patent
Laine et al.

(10) Patent No.: US 12,767,019 B2
(45) Date of Patent: Oct. 20, 2026

(54) RECREATIONAL VEHICLE SEAT ASSEMBLY

(71) Applicant: Textron Inc., Providence, RI (US)

(72) Inventors: Michael Laine, Graniteville, SC (US); Matthew Wilson, Graniteville, SC (US); Paul Morgan, Appling, GA (US)

(73) Assignee: TEXTRON INNOVATIONS INC., Providence, RI (US)

(*) Notice: Subject to any disclaimer, the term of this patent is extended or adjusted under 35 U.S.C. 154(b) by 119 days.

(21) Appl. No.: 18/806,991

(22) Filed: Aug. 16, 2024

(65) Prior Publication Data

US 2026/0048690 A1 Feb. 19, 2026

(51) Int. Cl.
*B60N 2/58* (2006.01)
*B60N 2/60* (2006.01)

(52) U.S. Cl.
CPC ......... *B60N 2/5825* (2013.01); *B60N 2/6027* (2013.01)

(58) Field of Classification Search
CPC ... B60N 2/6027; B60N 2/5825; B60N 2/7005
USPC ..................................................... 297/452.38
See application file for complete search history.

(56) References Cited

U.S. PATENT DOCUMENTS 3,995,881 A 12/1976 Kruchell
4,065,181 A * 12/1977 Gunlock .............. B60N 2/7023 297/440.22
4,065,182 A * 12/1977 Braniff ................. B60N 2/7005 297/440.22
4,403,806 A 9/1983 Stephen
4,544,205 A * 10/1985 Molnar .................. A47C 31/02 297/440.22
4,836,609 A * 6/1989 Hill ........................ B60N 2/686 297/218.1
5,067,773 A * 11/1991 Koa ....................... A47C 7/185 297/452.55
5,139,257 A 8/1992 Wu
5,152,489 A 10/1992 Christensen et al.
5,184,911 A 2/1993 Wu
5,310,155 A 5/1994 Wu
5,320,263 A 6/1994 Kobylack
5,441,329 A 8/1995 Janisch
5,465,930 A 11/1995 Wu
5,573,211 A 11/1996 Wu
5,975,390 A 11/1999 Saroli
6,036,264 A 3/2000 Lucree
6,106,071 A * 8/2000 Aebischer ............ B60N 2/2251 297/452.56
6,254,182 B1 7/2001 Townsend
6,371,560 B1 4/2002 Fulford et al.
6,386,362 B1 5/2002 Cheng
6,499,591 B1 12/2002 Rizzo et al.
(Continued)

*Primary Examiner* — Milton Nelson, Jr.
(74) *Attorney, Agent, or Firm* — Foley & Lardner LLP

(57) ABSTRACT

A seat bottom assembly for a seat of a recreational vehicle includes a cushion having a top cushion surface, a sidewall, and a bottom cushion surface, a cushion covering disposed along the top cushion surface and the sidewall of the cushion, a lower portion of the cushion covering extending beyond the sidewall, a ring having a top ring surface in contact with the bottom cushion surface and a bottom ring surface, and a base detachably coupled to the bottom ring surface of the ring. The lower portion of the cushion covering is sandwiched between the ring and the base.

18 Claims, 8 Drawing Sheets

(56) References Cited

U.S. PATENT DOCUMENTS

| | | | |
|---|---|---|---|
| 6,598,889 | B1 | 7/2003 | Su |
| 6,682,027 | B1 | 1/2004 | Chang |
| 6,948,777 | B2 | 9/2005 | Marshall et al. |
| 6,955,363 | B2 | 10/2005 | Libretti et al. |
| 7,232,183 | B1 | 6/2007 | Haught |
| 7,407,169 | B2 | 8/2008 | Splain et al. |
| 7,891,629 | B2 | 2/2011 | Moyers |
| 7,997,595 | B1 | 8/2011 | Pope |
| 8,333,429 | B2 | 12/2012 | Nelson et al. |
| 8,590,906 | B1 | 11/2013 | Sanchez |
| 8,777,307 | B2 | 7/2014 | Nelson et al. |
| 9,044,087 | B1 | 6/2015 | Corcorran et al. |
| 9,078,526 | B1 | 7/2015 | Kammeyer |
| 9,260,061 | B1 | 2/2016 | Rudd |
| 10,414,425 | B2 | 9/2019 | Nix |
| 10,569,716 | B1 | 2/2020 | Law et al. |
| 10,792,547 | B2 | 10/2020 | Coln |
| 11,396,317 | B2 | 7/2022 | Eisele |
| 2002/0067061 | A1 | 6/2002 | Veron |
| 2004/0026955 | A1 | 2/2004 | Dolan et al. |
| 2004/0226839 | A1 | 11/2004 | Su |
| 2005/0005382 | A1 | 1/2005 | Korodi |
| 2006/0081668 | A1 | 4/2006 | Haines et al. |
| 2007/0063461 | A1 | 3/2007 | Peota et al. |
| 2007/0108709 | A1 | 5/2007 | Wu |
| 2007/0205649 | A1 | 9/2007 | Hanson et al. |
| 2008/0088174 | A1 | 4/2008 | Lantsbury et al. |
| 2009/0302578 | A1 | 12/2009 | White et al. |
| 2012/0103715 | A1 | 5/2012 | Deslippe |
| 2014/0152048 | A1 | 6/2014 | Sobik |
| 2014/0300129 | A1 | 10/2014 | Schneider |
| 2015/0344108 | A1 | 12/2015 | Mcguire et al. |
| 2016/0317885 | A1 | 11/2016 | Anderson et al. |
| 2019/0201761 | A1 | 7/2019 | Danielson |
| 2022/0023731 | A1 | 1/2022 | Brown |

* cited by examiner

RECREATIONAL VEHICLE SEAT ASSEMBLY

BACKGROUND

Recreational vehicles are used to transport personnel and equipment between different areas. By way of example, a recreational vehicle may transport golfers and equipment (e.g., golf bags, golf clubs, etc.) around a golf course (e.g., along a cart path, between different holes, etc.). It may be desirable to improve the comfort of operators and/or passengers of the recreational vehicle, while lengthening a lifespan and maintenance of a seat assembly of the recreational vehicle.

SUMMARY

One embodiment relates to a seat bottom assembly for a seat of a recreational vehicle. The seat bottom assembly includes a cushion having a top cushion surface, a sidewall, and a bottom cushion surface. The seat bottom assembly also includes a cushion covering disposed along the top cushion surface and the sidewall of the cushion. A lower portion of the cushion covering extends beyond the sidewall. The seat bottom assembly includes a ring having a top ring surface in contact with the bottom cushion surface and a bottom ring surface and a base detachably coupled to the bottom ring surface of the ring. The lower portion of the cushion covering is sandwiched between the ring and the base.

Another embodiment relates to a seat bottom assembly for a seat of a recreational vehicle. The seat bottom assembly includes a cushion, a cushion covering, a first component, and a second component. The cushion has a top cushion surface, a sidewall, and a bottom cushion surface. The cushion covering is disposed along the top cushion surface and the sidewall of the cushion. A lower portion of the cushion covering extends beyond the sidewall. The lower portion has a first plurality of interfaces. The first component has a top surface in contact with the bottom cushion surface and a bottom surface. The first component includes a plurality of retainers disposed and spaced along the bottom surface. The plurality of retainers are in engagement with the first plurality of interfaces. The first component includes a second plurality of interfaces disposed and spaced along the bottom ring surface. The second component has a third plurality of interfaces configured to align with the second plurality of interfaces to facilitate detachably coupling the second component to the bottom surface of the first component. The lower portion of the cushion covering is sandwiched between the first component and the second component.

Still another embodiment relates to a relates to a seat bottom assembly for a seat of a recreational vehicle. The seat bottom assembly includes a cushion, a cushion covering, a first component, a second component, and a plurality of fasteners. The cushion has a top cushion surface, a sidewall, and a bottom cushion surface. The cushion covering is disposed along the top cushion surface and the sidewall of the cushion. A lower portion of the cushion covering extends beyond the sidewall. The lower portion has a plurality of slits. The first component has a top surface in contact with the bottom cushion surface and a bottom surface. The first component includes a plurality of hooks disposed and spaced along the bottom surface. The plurality of hooks are in engagement with the plurality of slits. The first component includes a plurality of bosses disposed and spaced along the bottom ring surface. The second component defines a plurality of apertures configured to align with the plurality of bosses. The plurality of fasteners extend through the plurality of apertures into the plurality of bosses to detachably couple the second component to the bottom surface of the first component. The lower portion of the cushion covering is sandwiched between the first component and the second component.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
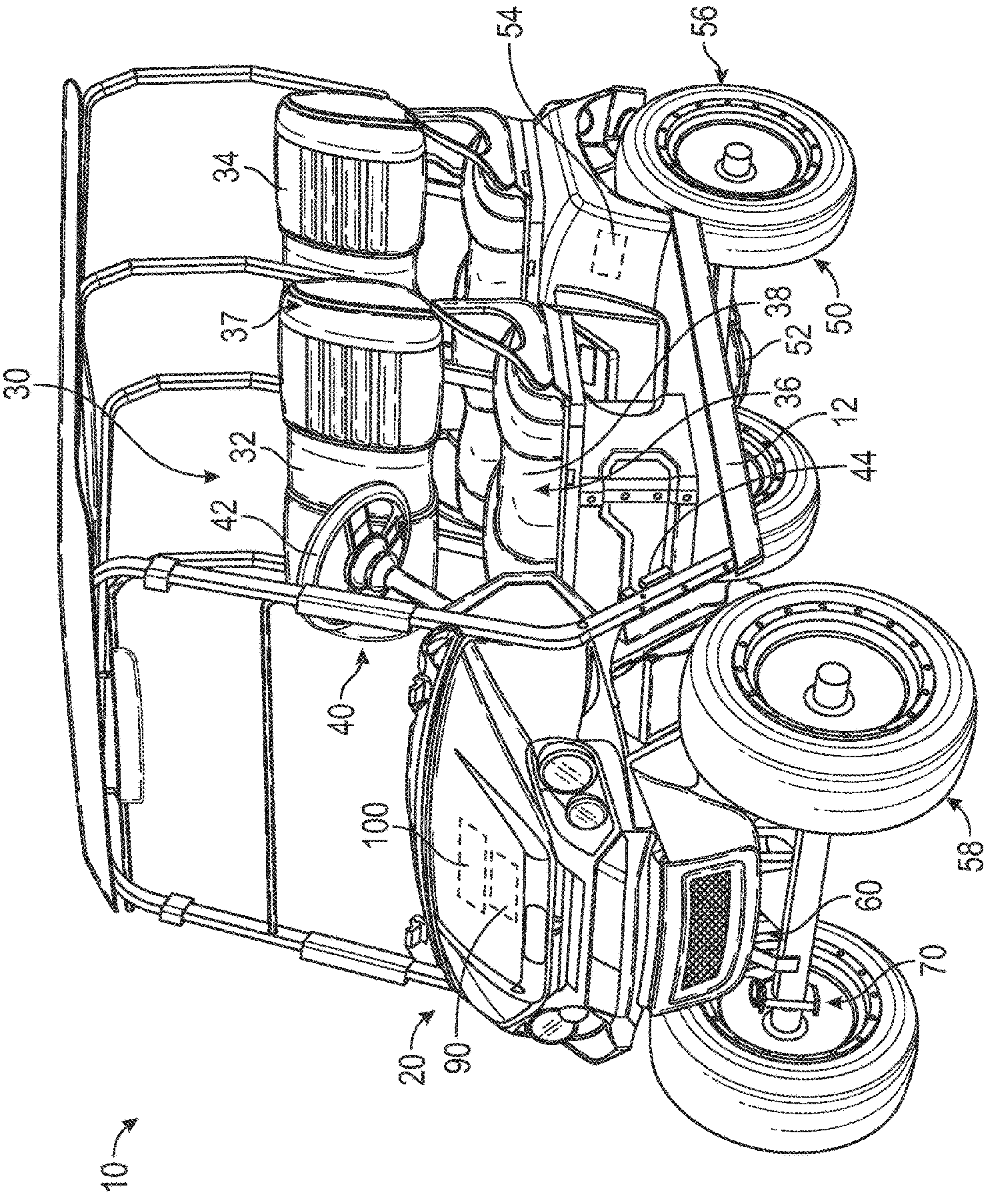
FIG. 1 is a perspective view of a vehicle, according to an exemplary embodiment.
Figure 2:
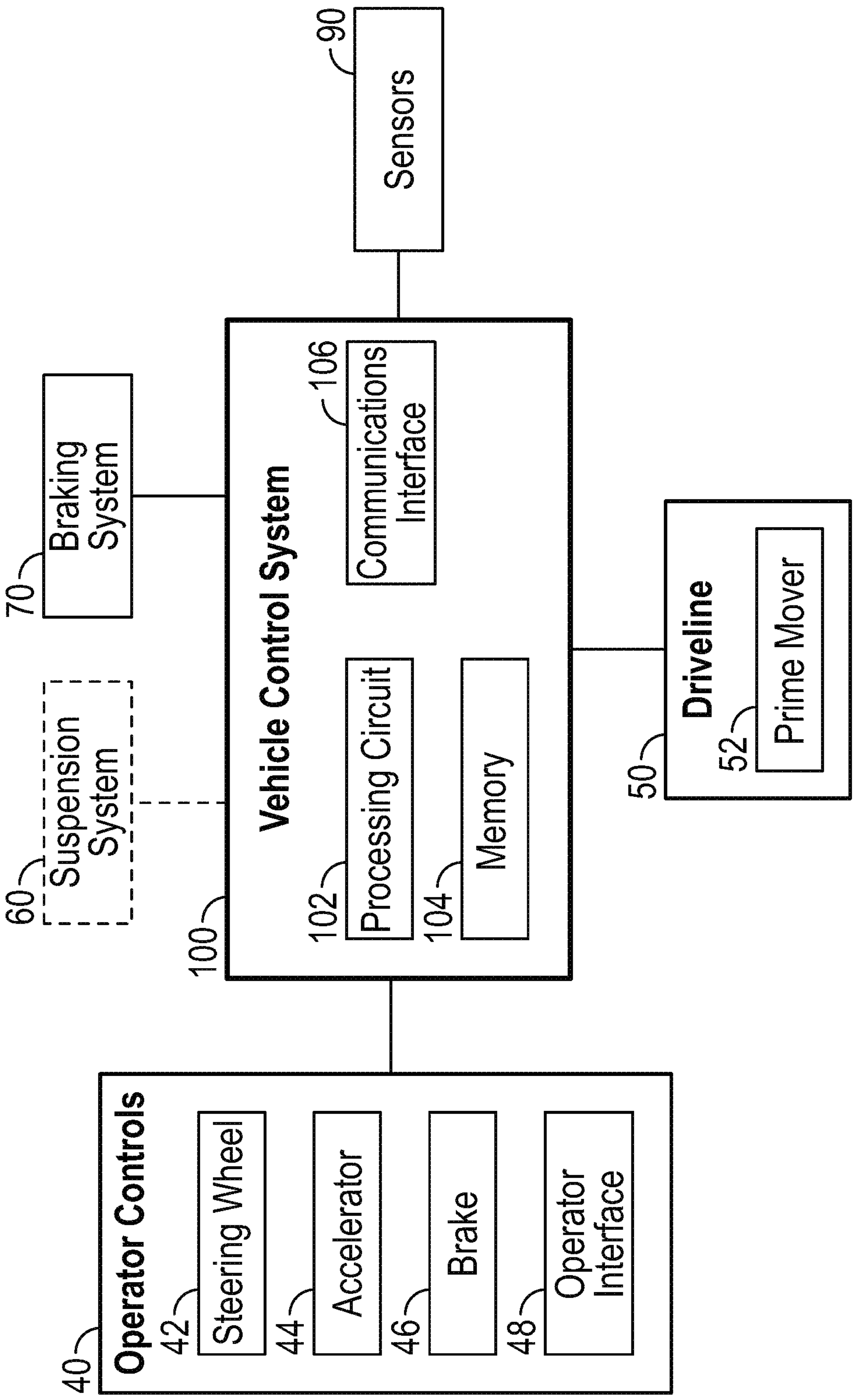
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a control system, shown as vehicle control system 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart, an all-terrain vehicle ("ATV"), a utility task vehicle ("UTV"), a low speed vehicle ("LSV"), a personal transport vehicle ("PTV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

As shown in FIG. 1, the front row seating 32 includes a first seat portion, shown as seat bottom 36, and a second set portion, shown as seat back 37. The seat bottom 36 extends substantially horizontally and supports the bottom of the occupant. The seat back 37 extends substantially vertically and supports the back of the occupant. As shown in FIG. 1, the seat bottom 36 includes an assembly, shown as seat bottom assembly 38. In some embodiments, the rear row seating 34 also includes the seat bottom 36 (and the seat bottom assembly 38) and the seat back 37.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a proximity detection sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle control system 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle control system 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle control system 100 may represent a collection of processing devices. In such cases, the processing circuit 102 represents the collective processors of the devices, and the memory 104 represents the collective storage devices of the devices.

In one embodiment, the vehicle control system 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle control system 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle control system 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Seat Bottom Assembly

Figure 3:
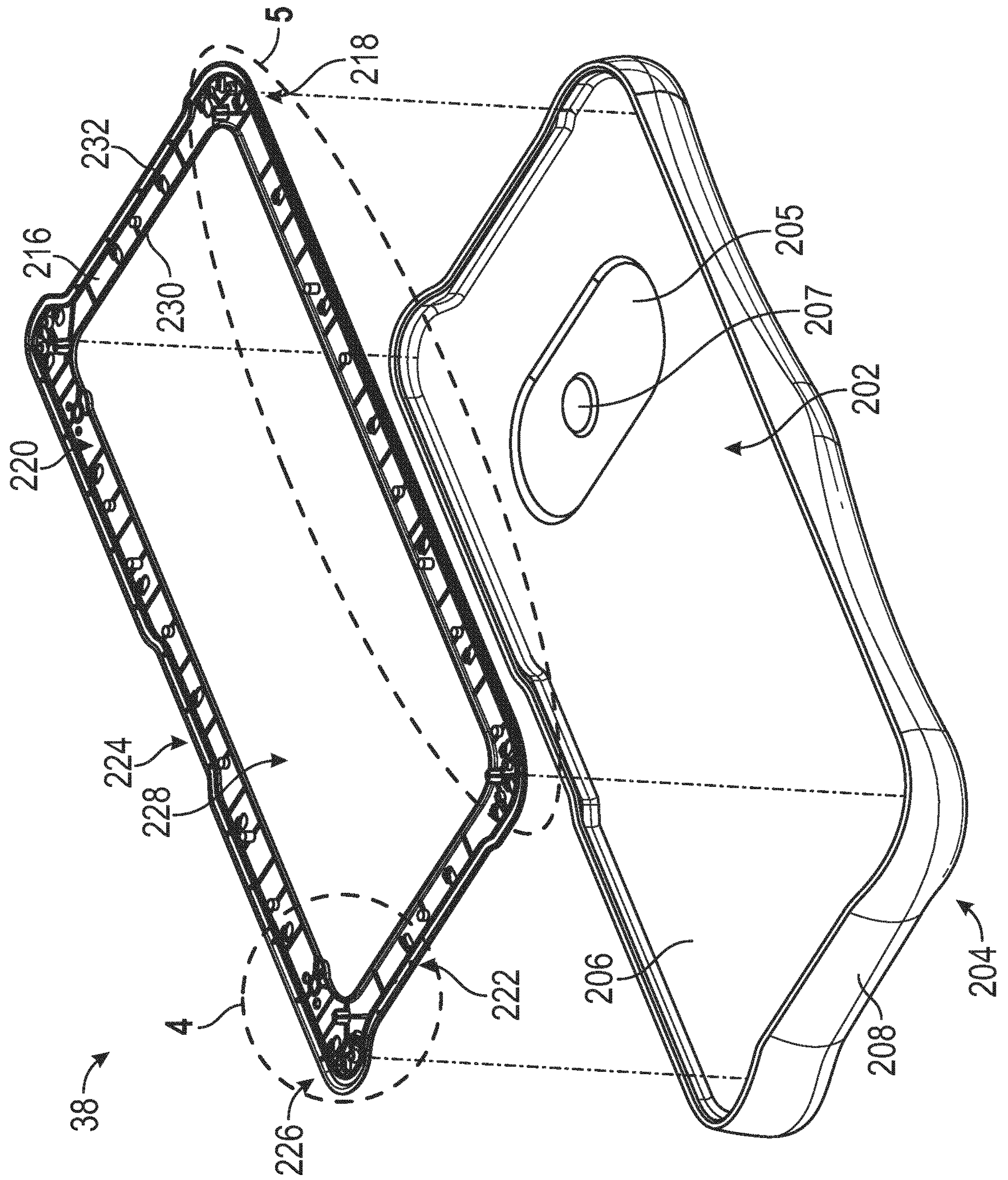
FIG. 3 is a perspective view of a ring and a seat bottom of a seat bottom assembly of the vehicle of FIG. 1, according to an exemplary embodiment.
Figure 4:
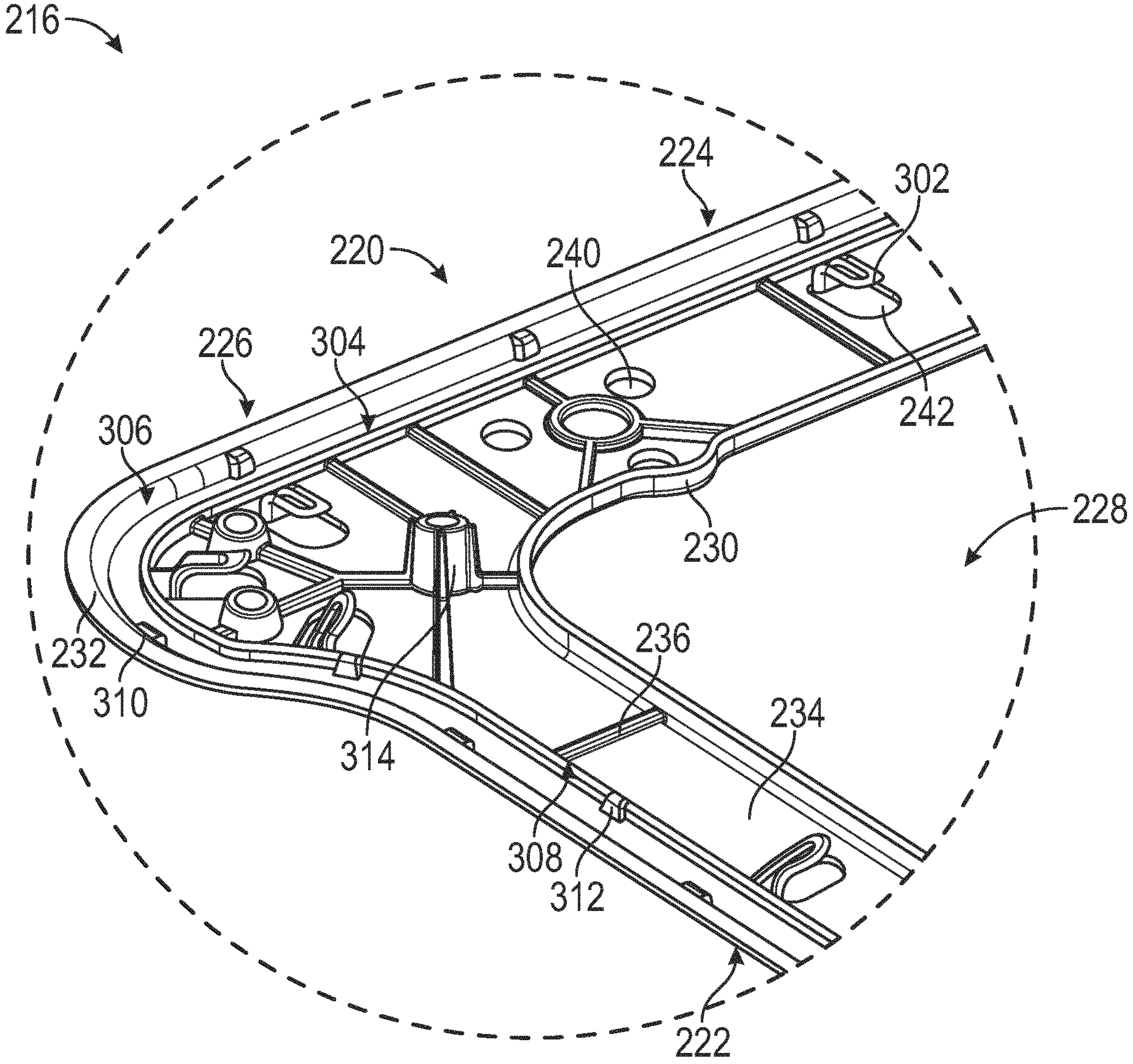
FIG. 4 is a detailed view showing a first portion of the ring of FIG. 3, according to an exemplary embodiment.
Figure 5:
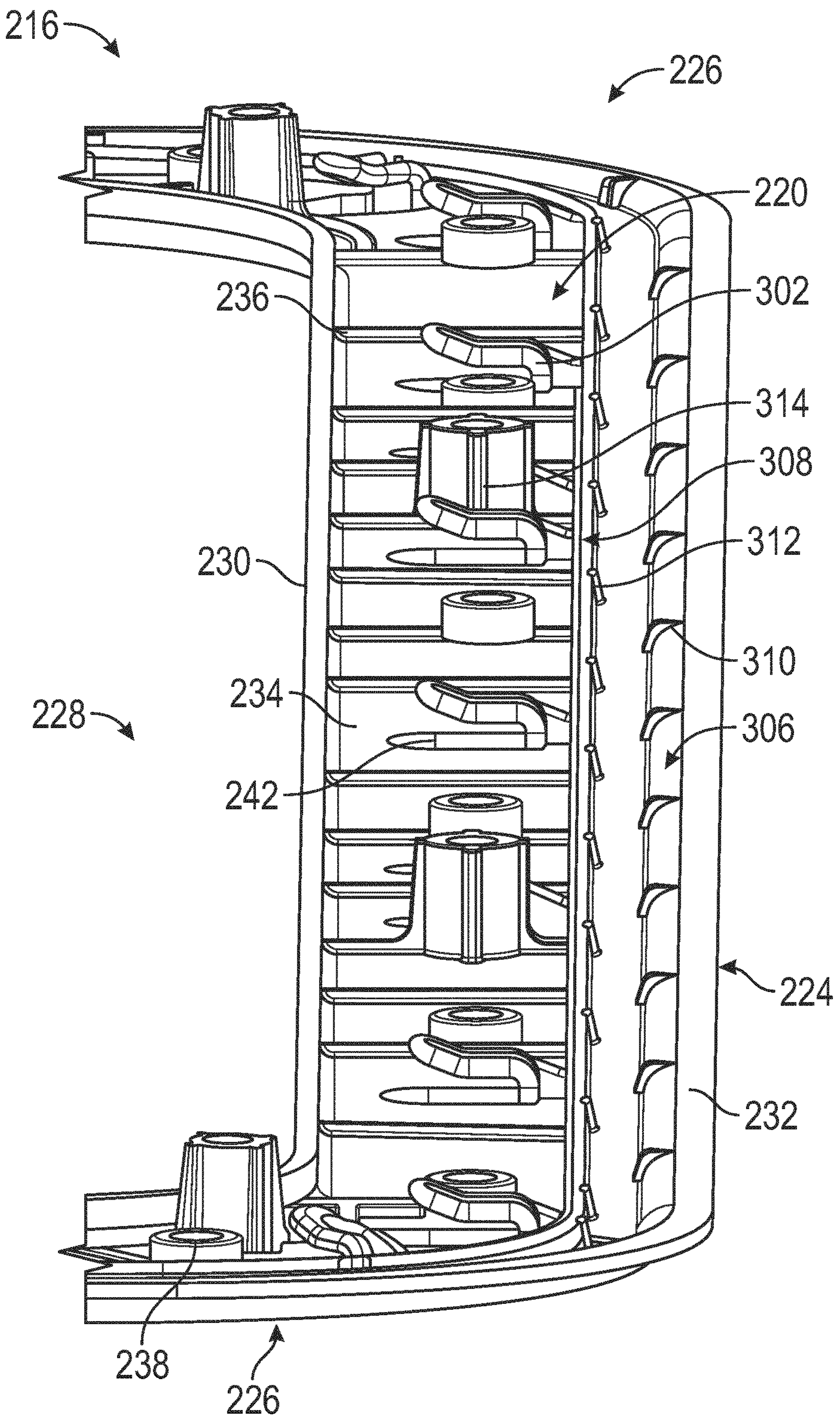
FIG. 5 is a detailed view showing a second portion of the ring of FIG. 3, according to an exemplary embodiment.
Figure 6:
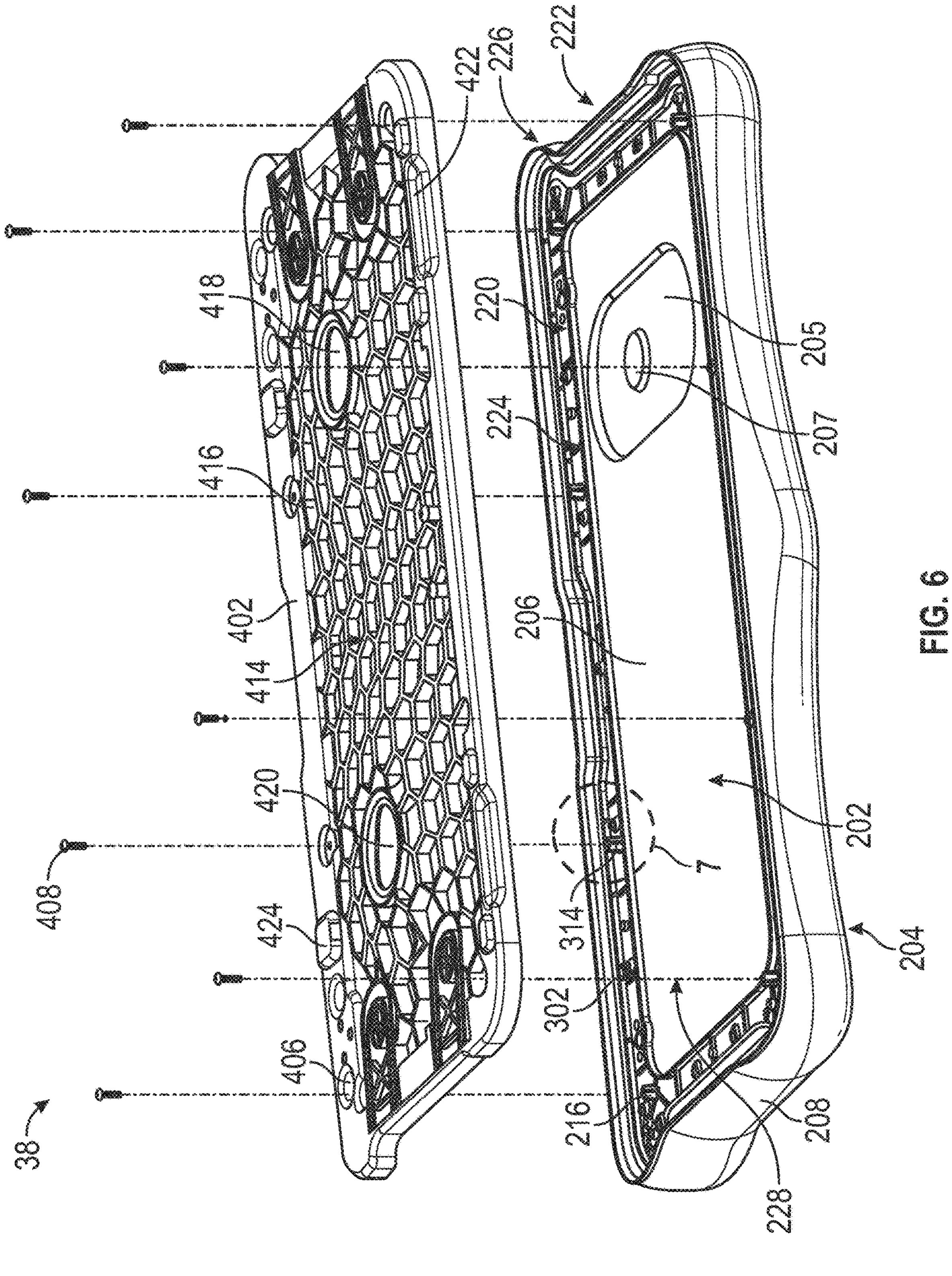
FIG. 6 is a perspective view showing the seat bottom assembly of the vehicle of FIG. 3 including a base, according to an exemplary embodiment.
Figure 7:
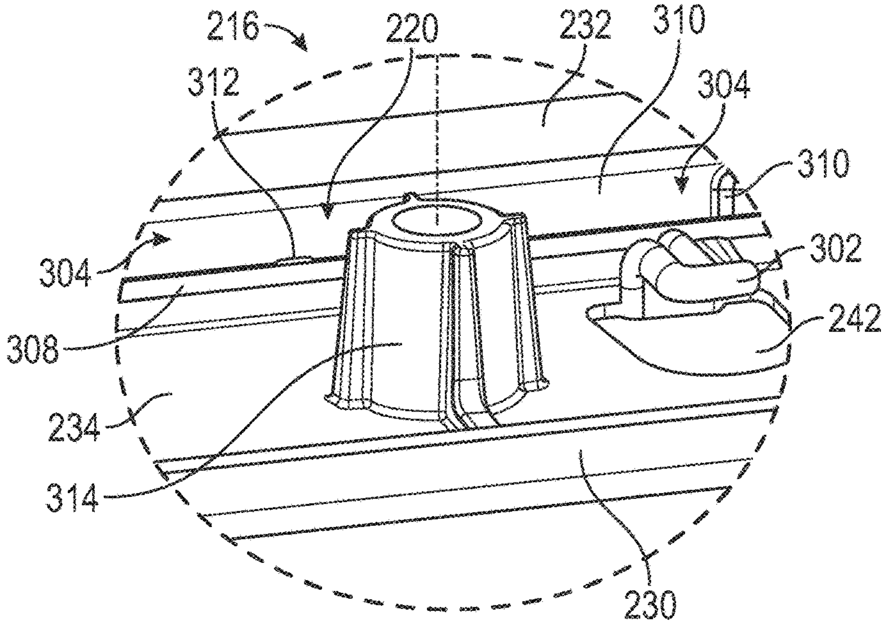
FIG. 7 is a detailed view showing a third portion of the ring of FIG. 6, according to an exemplary embodiment.

As shown in FIGS. 3-9, the seat bottom assembly 38 includes a cushioning component (e.g., padding, comfort layer, cushioning material, etc.), shown as cushion 202. According to an exemplary embodiment, the cushion 202 includes a foam material. As shown in FIGS. 3, 6, 8, and 9, the cushion 202 includes a first surface, shown as top cushion surface 204, an opposing second surface, shown as bottom cushion surface 206, and a third surface, shown as sidewall 208, extending between the top cushion surface 204 and the bottom cushion surface 206. The top cushion surface 204 faces upwards (e.g., towards the seat back 37) while the bottom cushion surface 206 faces downwards (e.g., towards the frame 12 of the vehicle 10, towards a pedestal of the seat). The sidewall 208 extends along a periphery of the cushion 202. As shown in FIGS. 3 and 6, the bottom cushion surface 206 defines a receptacle, shown as cavity 205, and a raised surface, shown as projection 207. The cavity 205 has an oval shape and the projection 207 is disposed on a surface of the cavity 205. The projection 207 is located offset a center of the cavity 205.

Figure 8:
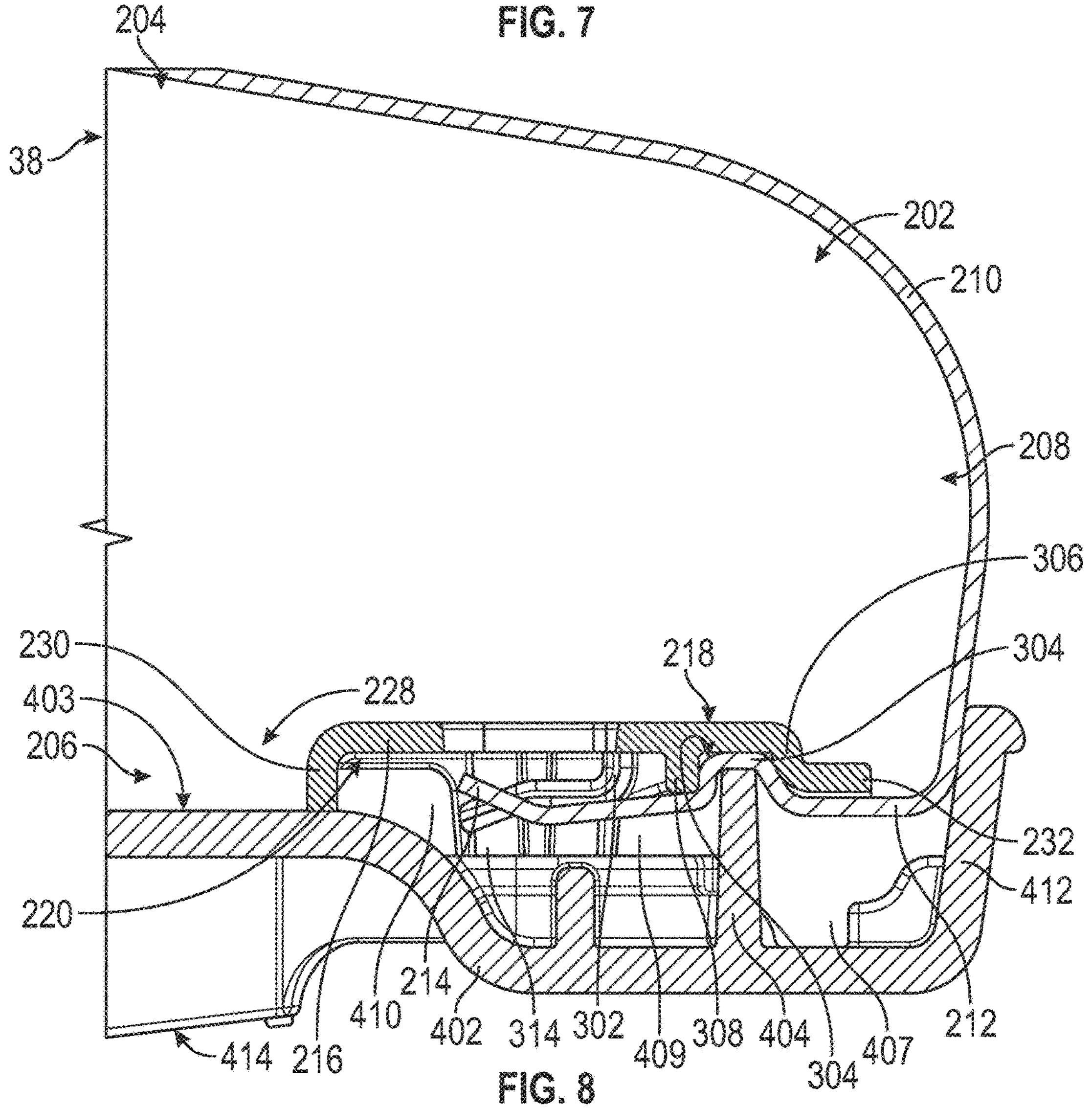
FIG. 8 is a cross-sectional view of a portion of the seat bottom assembly of FIG. 6, according to an exemplary embodiment.
Figure 9:
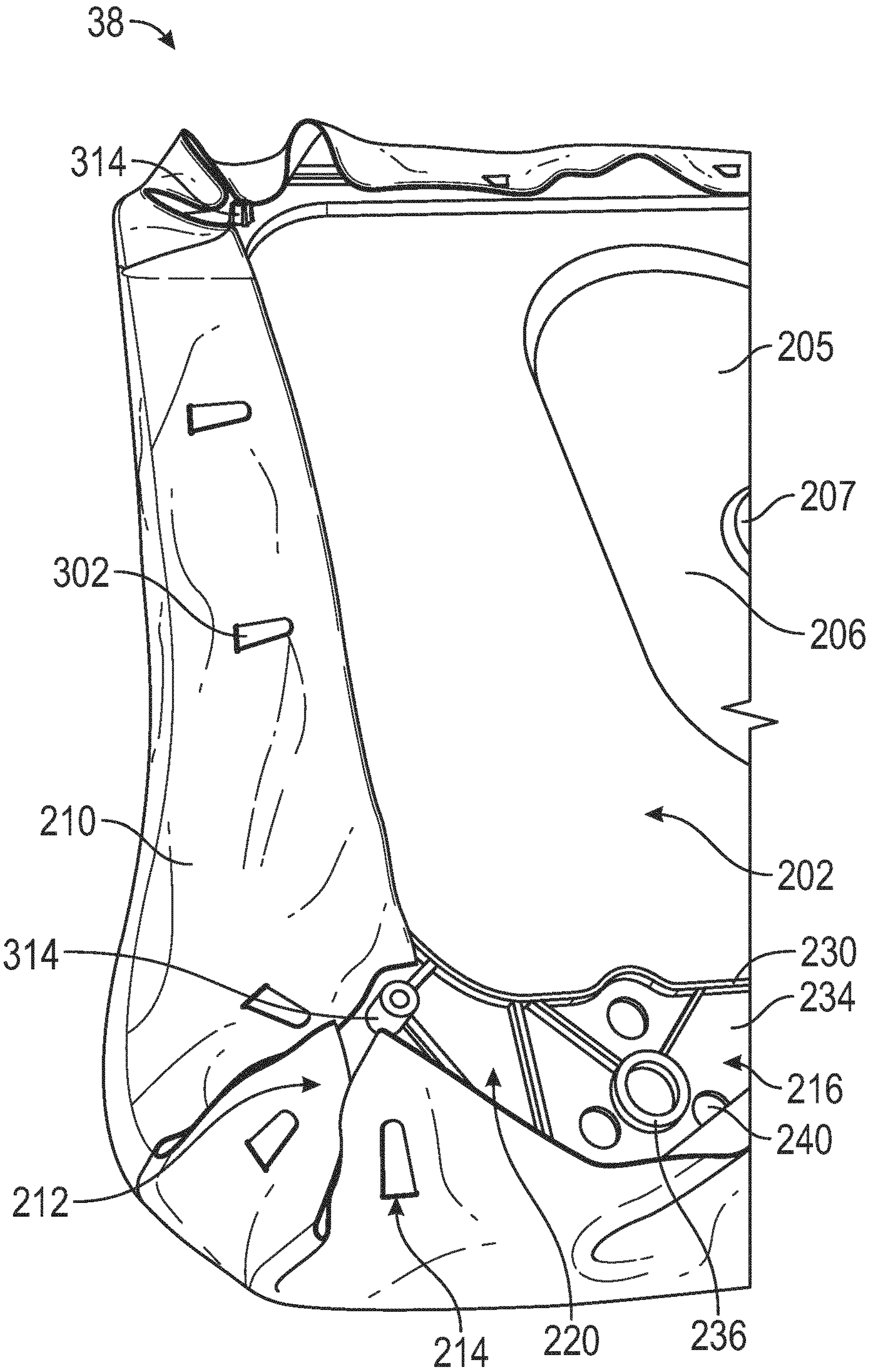
FIG. 9 is a perspective view of a portion of the seat bottom assembly of FIG. 3, according to an exemplary embodiment.

As shown in FIGS. 8 and 9, the seat bottom assembly 38 includes a cushion housing (e.g., a cushion protector), shown as cushion covering 210. The cushion covering 210 includes (a) a first portion (e.g., an upper portion) disposed along the top cushion surface 204 and the sidewall 208 and (b) a second portion (e.g., an edge portion, a bottom portion, etc.), shown as a lower portion 212, that extends beyond the sidewall 208. In some embodiments, the first portion of the cushion covering 210 is detachably coupled to the cushion 202. In some embodiments, the first portion of the cushion covering 210 is not detachably coupled to the cushion 202 (e.g., the cushion 202 and the cushion covering 210 are formed as one piece). By way of example, the cushion 202 and the cushion covering 210 may be manufactured using a foam-in-place process where the cushion covering 210 and the cushion 202 are integral. By way of another example, the cushion covering 210 may be cut and sewn to the cushion 202. As shown in FIG. 8, at least a portion of the lower portion 212 of the cushion covering 210 is at least partially in contact with the bottom cushion surface 206 of the cushion 202. In some embodiments, the cushion covering 210 does not engage with the bottom cushion surface 206 of the cushion 202. In some embodiments, the cushion covering 210 includes or is manufactured from a polymeric material (e.g., vinyl). In some embodiments, the cushion covering 210 includes or is manufactured from another type of material (e.g., leather, cotton, polyester, nylon, canvas, etc.). As shown in FIG. 9, the lower portion 212 of the cushion covering 210 defines a first plurality of interfaces, shown as slits 214. In other embodiments, the lower portion 212 of the cushion covering 210 defines or includes a different type of interfaces (e.g., hook and loop fasteners, snap interfaces, button interfaces, etc.).

As shown in FIGS. 3-9, the seat bottom assembly 38 includes a first attachment component (e.g., device), shown as ring 216. While shown to be configured as a ring, in other embodiments, the first attachment component is configured as plate-like component. As shown in FIGS. 3-9, the ring 216 includes a first surface, shown as top ring surface 218, in contact or engagement with the bottom cushion surface 206 and an opposing second surface, shown as bottom ring surface 220, at least partially in contact or engagement with the lower portion 212 of the cushion covering 210. In some embodiments, the ring 216 includes or is manufactured from a polymeric material. In some embodiments, the base 402 includes a glass-filled material (e.g., a glass-filled polymeric material, fiber glass, etc.). In some embodiments, the ring 216 includes or is manufactured from a carbon fiber material (e.g., carbon fiber reinforced plastic). In some embodiments, the ring 216 includes or is manufactured from a metallic material (e.g., aluminum).

As shown in FIGS. 3, 5, and 6, the ring 216 includes a first pair of portions, shown as lateral portions 222, a second pair of portions, shown as longitudinal portions 224, and a plurality of connector portions, shown as corner portions 226. The corner portions 226 connect the lateral portions 222 and the longitudinal portions 224 together to define an aperture, shown as inner cavity 228, therebetween. According to the exemplary embodiment shown in FIG. 3, the longitudinal portions 224 are longer than the lateral portions 222 such that the ring 316 has a generally rectangular shape of the ring 216. Accordingly, the ring 216 may be utilized with a multi-person or bench style seat. In other embodiments, the ring 216 has a generally square shape or a rectangular shape where the lateral portions 222 and the longitudinal portions 224 are similar in length. Such a ring 216 may be utilized with a single-person or captain-style chair. As shown in FIG. 6, the lateral portions 222, the longitudinal portions 224, and the corner portions 226 span a periphery of the bottom cushion surface 206. In various embodiments, the ring 216 interfaces with a recess of the bottom cushion surface 206. By way of example, the bottom cushion surface 206 may define the recess having a shape that corresponds with the top ring surface 218 and the ring 216 interfaces with such recess. In some embodiments, the top ring surface 218 of the ring 216 is fixedly coupled to the bottom cushion surface 206 of the cushion 202 (e.g., using adhesive, heat welded, etc.).

As shown in FIGS. 3-5 and 8, the ring 216 has (a) an inner rim, shown as inner lip 230, extending along an inner periphery of the ring 216 that defines the inner cavity 228 and (b) an outer rim, shown as an outer lip 232, extending along an outer periphery of the ring 216. As shown in FIG. 8, the inner lip 230 and the outer lip 232 contact and engage with the cushion 202. In some embodiments, a height of the outer lip 232 along the corner portions 226 is different than the height of the outer lip 232 along the lateral portions 222 and the longitudinal portions 224. In such embodiments, the height of the outer lip 232 along the corner portions 226 may be less than the height of the outer lip 232 along the lateral portions 222 and the longitudinal portions 224 to accommodate for additional material of the cushion covering 210 within the corner portions 226.

As shown in FIGS. 4, 5, 7, and 8, the bottom ring surface 220 defines a first lowered portion or recess, shown as inner channel 234, positioned proximate the inner lip 230 and a second lowered portion or recess, shown as outer channel 304, positioned proximate the outer lip 232. The inner channel 234 and the outer channel 304 extend around at least a portion of a periphery of the bottom ring surface 220. In some embodiments, the inner channel 234 and the outer channel 304 extend along the periphery of the bottom ring surface 220 on the lateral portions 222, the longitudinal portions 224, and the corner portions 226.

As shown in FIGS. 4, 5, and 8, the outer channel 304 is formed between a first wall, shown as outer sidewall 306, proximate the outer lip 232 and a second wall, shown as inner sidewall 308, proximate the inner channel 234. The outer sidewall 306 includes a first plurality of protrusions, shown as outer ribs 310, and the inner sidewall 308 includes a second plurality of protrusions, shown as inner ribs 312, extending into the outer channel 308. The outer ribs 310 are disposed and spaced along the outer sidewall 306 of the outer channel 304. The inner ribs 312 are disposed and spaced along the inner sidewall 308. According to an exemplary embodiment, the outer ribs 310 and the inner ribs 312 are at least partially offset from each other. In other embodiments, the outer ribs 310 and the inner ribs 312 are aligned. As shown in FIG. 8, the lower portion 212 of the cushion covering 210 is at least partially received within the outer channel 304. The outer ribs 310 and the inner ribs 312 provide additional contact points between the outer channel 304 and the lower portion 212 of the cushion covering 210.

In some embodiments, a height of the inner sidewall 308 (and the inner ribs 312) varies along the periphery of the ring 216. By way of example, the inner sidewall 308 may have a first height along first portions of the ring 216 and a second height along second portions of the ring 216 where the first height is less than the second height. More specifically, the inner sidewall 308 may have the first height along the corner portions 226 and the inner sidewall 308 may have the second height along the lateral portions 222 and the longitudinal portions 224. Such variation in the height of the inner sidewall 308 may facilitate better accommodation and retention of the cushion covering 210 along the corner portions 226 (e.g., additional material of the cushion covering 210 along the corner portions 226 compared to the pair of lateral portions 222 and the pair of longitudinal portions 224 due to the curvature).

As shown in FIGS. 4, 5, and 8, the inner channel 234 is formed between the inner sidewall 308 and the inner lip 230, proximate the inner channel 234. According to the exemplary embodiment shown in FIGS. 4, 5, and 8, a width of the inner channel 234 is greater than a width of the outer channel 304. As shown in FIGS. 4 and 5, the inner channel 234 has a plurality of support members (e.g., ribs, gussets, beams, etc.), shown as supports 236, extending therealong. The support 236 extend between the inner sidewall 308 and the inner lip 230 to provide additional support to the ring 216. As shown in FIG. 4, the supports 236 include straight, circular, or angled supports. As shown in FIG. 4, the inner channel 234 defines a first plurality of apertures, shown as openings 240, spaced along a periphery of the ring 216. In some embodiments, the openings 240 are configured to receive fasteners to secure the ring 216 to the cushion 202. In some embodiments, the openings 240 are configured to functions as drainage holes (e.g., to drain water). As shown in FIGS. 4, 5, and 8, the inner channel 234 defines a second plurality of apertures, shown as slots 242, spaced along a periphery of the ring 216.

As shown in FIGS. 4, 5, and 7-9, the bottom ring surface 220 includes a plurality of retainers, shown as hooks 302, positioned along and extending from the inner channel 234 of the lateral portions 222, the longitudinal portions 224, and the corner portions 226. In some embodiments, one or more of the lateral portions 222, the longitudinal portions 224, and the corner portions 226 do not include the hooks 302. As shown in FIGS. 3-5 and 9, the ring 216 includes three of the hooks 302 disposed along each of the corner portions 226. In other embodiments, the ring 216 includes a different number of the hooks 302 along the corner portions 226. As shown in FIG. 4, the plurality of hooks 302 extend from an edge of the slots 242 that is positioned proximate the inner sidewall 308. As shown in FIG. 8, a height of the hooks 302 is greater than height of the inner lip 230, the inner sidewall 308, and the outer lip 232.

As shown in FIG. 9, the hooks 302 engage with and extend through the slits 214 of the lower portion 212 of the cushion covering 210. Such engagement allows for the cushion covering 210 to be detachably coupled to the ring 216, which allows for replacement or maintenance of the cushion covering 210 (e.g., in embodiments wherein the cushion covering 210 is removable from the cushion 202). In some embodiments, the hooks 302 include a polymeric material and are flexible. The hooks 302 may bend to allow for attachment and detachment of the cushion covering 210 to the ring 216. In some embodiments, the lower portion 202 of the cushion covering 210 is additionally or alternatively coupled to the ring 216 via fasteners (e.g., staples, screws, etc.) and/or an adhesive.

As shown in FIGS. 4-9, the ring 216 includes a second plurality of interfaces, shown as bosses 314, disposed and spaced along the inner channel 234 between the inner sidewall 308 and the inner lip 230. The bosses 314 are coupled to a subset of the supports 236. The plurality of bosses 314 extend beyond the plurality of hooks 302, the inner sidewall 308, the inner lip 230, and the outer lip 232.

As shown in FIGS. 6 and 8, the seat bottom assembly 38 includes a second attachment component (e.g., device), shown as base 402. While shown to be configured as a plate-like component, in other embodiments, the second attachment component is configured as ring-like component. As shown in FIGS. 6 and 8, the base 402 is detachably coupled to the ring 216 such that the lower portion 212 of the cushion covering 210 is sandwiched between the bottom ring surface 220 of the ring 216 and the base 402. In some embodiments, the base 402 includes or is manufactured from a polymeric material. In some embodiments, the base 402 includes a glass-filled material (e.g., a glass-filled polymeric material, fiber glass, etc.). In some embodiments, the base 402 includes or is manufactured from a carbon fiber material (e.g., carbon fiber reinforced plastic). In some embodiments, the base 402 includes or is manufactured from a metallic material (e.g., aluminum).

According to an exemplary embodiment, the base 402 provides additional support to the cushion 202 and additional securement of the cushion covering 210 to the ring 216. As shown in FIG. 8, a portion of the cushion 202 extends through the inner cavity 228 and engages (e.g., contacts) the base 402. The base 402 thus provides additional support to the cushion 202, and receives and distributes force from the cushion 202 (e.g., the occupant sitting on the cushion 202). As shown in FIG. 8, the base 402 includes a protrusion, shown as base rib 404, extending from a first base surface, shown as the top base surface 403, of the base 402. The base rib 404 is configured to engage with the outer channel 304 of the ring 216 such that the lower portion 212 of the cushion covering 210 is sandwiched between the base rib 404 and the outer channel 304. The base rib 404 thus provides additional securement of the lower portion 212 within the outer channel 304. The base rib 404 press-fits the lower portion 212 into the outer channel 304 and into engagement with the outer ribs 310 and the inner ribs 312. In some embodiments, the base rib 404 extends along the periphery of the base 402. In other embodiments, the base rib 404 includes a plurality of discrete protrusions spaced along the periphery of the base 402. In some embodiments, the base 402 does not include the base rib 404.

As shown in FIG. 6, the base 402 defines a third plurality of interfaces, shown as apertures 406. The apertures 406 align with the bosses 314 to facilitate detachably coupling the ring 216 to the base 402. As shown in FIG. 6, a plurality of couplers, shown as fasteners 408, are configured to extend through the apertures 406 and engage with the bosses 314 to couple the base 402 to the ring 216. In some embodiments, the fasteners 408 are or include screws. In some embodiments, the fasteners are or include Christmas tree fastener clips. In other embodiments, the bosses 314 extends at least partially through the apertures 406 to provide a snap-fit connection.

As shown in FIG. 8, the base 402 includes a first space, shown as a first receiving space 407, a second space, shown as a second receiving space 409, and a third space, shown as a third receiving space 410. The first receiving space 407 extends at least partially along a periphery of the base 402. The first receiving space 407 is disposed between the base rib 404 and an outer edge, shown as an outer wall 412, of the base 402. The outer wall 412 extends along the periphery of the base 402, and is formed by both the top base surface 403 and a second base surface, shown as bottom base surface 414. As shown in FIG. 8, the outer wall 412 at least partially engages with the sidewall 208 of the cushion 202. In some embodiments, the first receiving space 407 receives (e.g., contacts) at least a portion of the lower portion 212 of the cushion covering 210. The second receiving space 409 and the third receiving space 410 are defined by at least one of the plurality of bosses 314 interfacing (e.g., contacting) the top base surface 403. The second receiving space 409 is disposed between the bosses 314 and the base rib 404. The second receiving space 409 receives at least a portion of the lower portion 212 of the cushion covering 210. The third receiving space 410 is disposed between the bosses 314 and the inner lip 230. In some embodiments, the third receiving space 410 receives at least a portion of the lower portion 212 of the cushion covering 210.

As shown in FIG. 6, the bottom base surface 414 includes a plurality of cells, shown as cavities 416. According to the exemplary embodiment shown in FIG. 6, the shape of the cavities 416 is hexagonal. In other embodiments, the cavities 416 have another shape (e.g., triangle, etc.). As shown in FIG. 6, the base 402 defines a first aperture, shown as opening 418. The opening 418 is configured to align with the projection 207 to facilitate coupling the base 402 to the cushion 202. As shown in FIG. 6, the base 402 defines a second aperture, shown as opening 420. The projection 207 may align with either the opening 420 or the opening 418. As shown in FIG. 6, the base 402 defines a plurality of recesses, shown as indentations 422. The indentations 422 may function as handles to facilitate handling (e.g., moving) the seat bottom assembly 38. As shown in FIG. 6, the base 402 includes a plurality of protrusions, shown protrusions 424, extending from the bottom base surface 414. The plurality of protrusions 424 may contact or engage a portion of the seat bottom 36 (e.g., a pedestal).

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the seat bottom assembly 38, the operator controls 40, the driveline 50, the suspension system 60, the braking system 70, the sensors 90, and the vehicle control system 100, etc.) as shown in the various exemplary embodiments is illustrative only. Additionally, any element disclosed in one embodiment may be incorporated or utilized with any other embodiment disclosed herein.

The invention claimed is:

1. A seat bottom assembly for a seat of a recreational vehicle, the seat bottom assembly comprising:

a cushion having a top cushion surface, a sidewall, and a bottom cushion surface;

a cushion covering disposed along the top cushion surface and the sidewall of the cushion, a lower portion of the cushion covering extending beyond the sidewall;

a ring at least partially recessed within the cushion such that at least a top ring surface, an inner lip surface, and an outer lip surface of the ring are in contact with the cushion, the ring includes a plurality of protrusions protruding downward from a bottom ring surface; and a base in contact with the bottom cushion surface and defining a plurality of apertures configured to receive the plurality of protrusions of the ring.

2. The seat bottom assembly of claim 1, wherein the ring includes a plurality of retainers disposed on the bottom ring surface, the plurality of retainers in engagement with a plurality of interfaces positioned along the lower portion of the cushion covering.

3. The seat bottom assembly of claim 2, wherein the plurality of retainers include a plurality of hooks and the plurality of interfaces include a plurality of slits, and wherein the plurality of hooks extend through the plurality of slits.

4. The seat bottom assembly of claim 2, wherein the ring includes a pair of lateral portions, a pair of longitudinal portions, and a plurality of corners connecting the pair of lateral portions and the pair of longitudinal portions together, wherein the ring includes a rib extending around a periphery thereof, wherein a height of the rib along the plurality of corners is different than the height of the rib along the pair of lateral portions and the pair of longitudinal portions.

5. The seat bottom assembly of claim 1, wherein the ring defines a channel extending around at least a portion of a periphery of the bottom ring surface, and wherein the lower portion of the cushion covering is at least partially received within the channel.

6. The seat bottom assembly of claim 5, wherein the ring includes a plurality of retainers disposed on the bottom ring surface and positioned inward of the channel, the plurality of retainers in engagement with a plurality of interfaces positioned along the lower portion of the cushion covering.

7. The seat bottom assembly of claim 5, wherein the channel has a first sidewall, a second sidewall, a first plurality of ribs disposed along the first sidewall, and a second plurality of ribs disposed along the second sidewall.

8. The seat bottom assembly of claim 7, wherein the first plurality of ribs and the second plurality of ribs are offset from each other.

9. The seat bottom assembly of claim 5, wherein the base includes a protrusion positioned to interface with the channel and, thereby, secure the lower portion within the channel between the ring and the base.

10. The seat bottom assembly of claim 1, wherein a portion of the cushion extending through an inner cavity of the ring and engages with the base.

11. The seat bottom assembly of claim 1, further comprising a plurality of fasteners extending though the plurality of apertures into the plurality of protrusions.

12. The seat bottom assembly of claim 11, wherein the plurality of fasteners include at least one of screws or Christmas tree fastener clips.

13. The seat bottom assembly of claim 1, wherein the first plurality of protrusions and the plurality of apertures provide a snap-fit connection between the ring and the base.

14. The seat bottom assembly of claim 1, wherein at least one of the base or the ring comprises a polymeric material.

15. A seat bottom assembly for a seat of a recreational vehicle, the seat bottom assembly comprising:

a cushion having a top cushion surface, a sidewall, and a bottom cushion surface;

a cushion covering disposed along the top cushion surface and the sidewall of the cushion, a lower portion of the cushion covering extending beyond the sidewall, the lower portion having a first plurality of interfaces;

a first component at least partially recessed within the cushion such that at least a top surface, an inner lip surface, and an outer lip surface of the first component are in contact with the cushion, the first component including a plurality of protrusions disposed and spaced along a bottom surface; and a second component in contact with the bottom cushion surface of the first component and having a plurality of apertures configured to align with the plurality of protrusions to facilitate detachably coupling the second component to the bottom surface of the first component;

wherein the lower portion of the cushion covering is sandwiched between the first component and the second component.

16. The seat bottom assembly of claim 15, wherein the first component defines a channel extending around at least a portion of a periphery of the bottom surface, wherein the second component includes a protrusion positioned to interface with the channel, and wherein the lower portion of the cushion covering is at least partially received within the channel and press-fit therein by the protrusion.

17. The seat bottom assembly of claim 16, wherein the channel has a first sidewall, a second sidewall, a first plurality of ribs disposed along the first sidewall, and a second plurality of ribs disposed along the second sidewall, wherein the first plurality of ribs and the second plurality of ribs are offset from each other.

18. A seat bottom assembly for a seat of a recreational vehicle, the seat bottom assembly comprising:

a cushion having a top cushion surface, a sidewall, and a bottom cushion surface;

a cushion covering disposed along the top cushion surface and the sidewall of the cushion, a lower portion of the cushion covering extending beyond the sidewall, the lower portion having a plurality of slits;

a first component having a top surface in contact with the bottom cushion surface and a bottom surface, the first component including:

a plurality of hooks disposed and spaced along the bottom surface, the plurality of hooks in engagement with the plurality of slits; and a plurality of bosses disposed and spaced along the bottom surface;

a second component defining a plurality of apertures configured to align with the plurality of bosses; and a plurality of fasteners extending through the plurality of apertures into the plurality of bosses to detachably couple the second component to the bottom surface of the first component;

wherein the lower portion of the cushion covering is sandwiched between the first component and the second component.

* * * * *